(12) United States Patent
Blackmon et al.

(10) Patent No.: US 7,851,578 B2
(45) Date of Patent: Dec. 14, 2010

(54) SUCCINATE-CONTAINING POLYMERIZATION CATALYST SYSTEM USING N-BUTYLMETHYLDIMETHOXYSILANE FOR PREPARATION OF POLYPROPYLENE FILM GRADE RESINS

(75) Inventors: Kenneth P. Blackmon, Houston, TX (US); Joseph L. Thorman, League City, TX (US); Shabbir Ahmedbhai Malbari, Houston, TX (US); Michael Wallace, Dickinson, TX (US)

(73) Assignee: Fina Technology, Inc., Houston, TX (US)

( * ) Notice: Subject to any disclaimer, the term of this patent is extended or adjusted under 35 U.S.C. 154(b) by 127 days.

(21) Appl. No.: 11/958,874

(22) Filed: Dec. 18, 2007

(65) Prior Publication Data

US 2008/0161515 A1 Jul. 3, 2008

Related U.S. Application Data

(60) Provisional application No. 60/877,924, filed on Dec. 29, 2006.

(51) Int. Cl.
C08F 110/06 (2006.01)

(52) U.S. Cl. .................. 526/351; 526/124.3; 526/124.2; 526/125.3; 526/126; 502/103; 502/115; 502/116; 502/127

(58) Field of Classification Search ............... 526/124.3, 526/351, 124.2, 125.3, 126; 502/103, 115, 502/116, 127
See application file for complete search history.

(56) References Cited

U.S. PATENT DOCUMENTS

| | | | |
|---|---|---|---|
| 4,107,413 A | 8/1978 | Giannini et al. | |
| 4,115,319 A | 9/1978 | Scata et al. | |
| 4,218,339 A | 8/1980 | Zucchini et al. | |
| 4,220,554 A | 9/1980 | Scata et al. | |
| 4,271,060 A | 6/1981 | Hubby | |
| 4,294,721 A | 10/1981 | Cecchin et al. | |
| 4,298,718 A | 11/1981 | Mayr et al. | |
| 4,328,122 A | 5/1982 | Monte et al. | |
| 4,395,360 A | 7/1983 | Albizatti et al. | |
| 4,439,540 A | 3/1984 | Cecchin et al. | |
| 4,460,701 A | 7/1984 | Terano et al. | |
| 4,473,660 A | 9/1984 | Albizzati et al. | |
| 4,543,399 A | 9/1985 | Jenkins, III et al. | |
| 4,544,717 A | 10/1985 | Mayr et al. | |
| 4,562,173 A | 12/1985 | Terano et al. | |
| 4,588,790 A | 5/1986 | Jenkins, III et al. | |
| 4,927,797 A | 5/1990 | Ewen | |
| 4,971,937 A | 11/1990 | Albizzati et al. | |
| 5,001,205 A | 3/1991 | Hoel | |
| 5,028,670 A | 7/1991 | Chinh et al. | |
| 5,106,807 A | 4/1992 | Morini et al. | |
| 5,236,998 A | 8/1993 | Lundeen et al. | |
| 5,317,036 A | 5/1994 | Brady, III et al. | |
| 5,352,749 A | 10/1994 | DeChellis et al. | |
| 5,405,922 A | 4/1995 | DeChellis et al. | |
| 5,436,304 A | 7/1995 | Griffin et al. | |
| 5,456,471 A | 10/1995 | MacDonald | |
| 5,462,999 A | 10/1995 | Griffin et al. | |
| 5,489,634 A | 2/1996 | Hara et al. | |
| 5,525,678 A | 6/1996 | Mink et al. | |
| 5,589,555 A | 12/1996 | Zboril et al. | |
| 5,616,661 A | 4/1997 | Eisinger et al. | |
| 5,627,242 A | 5/1997 | Jacobsen et al. | |
| 5,665,818 A | 9/1997 | Tilston et al. | |
| 5,667,375 A | 9/1997 | Sebastiani | |
| 5,668,228 A | 9/1997 | Chinh et al. | |
| 5,891,817 A * | 4/1999 | Shamshoum et al. | ........ 502/127 |
| 5,945,366 A | 8/1999 | Kataoka et al. | |
| 6,090,325 A | 7/2000 | Wheat et al. | |
| 6,133,385 A | 10/2000 | Shamshoum et al. | |
| 6,147,024 A | 11/2000 | Shamshoum et al. | |
| 6,147,173 A | 11/2000 | Holtcamp | |
| 6,180,735 B1 | 1/2001 | Wenzel | |
| 6,207,606 B1 | 3/2001 | Lue et al. | |
| 6,211,105 B1 | 4/2001 | Holtcamp | |
| 6,242,545 B1 | 6/2001 | Jejelowo et al. | |
| 6,245,705 B1 | 6/2001 | Kissin | |
| 6,245,868 B1 | 6/2001 | Agapiou et al. | |
| 6,248,845 B1 | 6/2001 | Loveday et al. | |
| 6,255,247 B1 | 7/2001 | Shamshoum et al. | |
| 6,271,323 B1 | 8/2001 | Loveday et al. | |
| 6,274,684 B1 | 8/2001 | Loveday et al. | |
| 6,300,436 B1 | 10/2001 | Agapiou et al. | |
| 6,323,293 B1 | 11/2001 | Shamshoum et al. | |
| 6,339,134 B1 | 1/2002 | Crowther et al. | |
| 6,340,730 B1 | 1/2002 | Murray et al. | |
| 6,346,586 B1 | 2/2002 | Agapiou et al. | |
| 6,359,072 B1 | 3/2002 | Whaley | |
| 6,380,328 B1 | 4/2002 | McConville et al. | |
| 6,420,580 B1 | 7/2002 | Holtcamp et al. | |
| 6,657,024 B1 * | 12/2003 | Wallace et al. | ............... 526/128 |
| 7,109,143 B2 | 9/2006 | Blackmon et al. | |
| 7,112,642 B2 * | 9/2006 | Meesters et al. | ............. 526/351 |
| 7,202,191 B2 | 4/2007 | Blackmon et al. | |
| 2006/0035781 A1 | 2/2006 | Blackmon et al. | |

* cited by examiner

Primary Examiner—Ling-Siu Choi
(74) Attorney, Agent, or Firm—Tenley R. Krueger

(57) ABSTRACT

It has been discovered that using n-butylmethyldimethoxysilane (BMDS) as an external electron donor for succinate-containing Ziegler-Natta catalysts can provide a catalyst system that may prepare polypropylene films with improved properties. The catalyst systems of the invention provide for controlled chain defects/defect distribution and thus a regulated microtacticity along with broadened molecular weight distribution.

12 Claims, 7 Drawing Sheets

Complex Modulus (E*) vs. Temperature for Film Resins Prepared at 77 °C with THC A-021 Catalyst

SUCCINATE-CONTAINING POLYMERIZATION CATALYST SYSTEM USING N-BUTYLMETHYLDIMETHOXYSILANE FOR PREPARATION OF POLYPROPYLENE FILM GRADE RESINS

FIELD OF THE INVENTION

The present invention relates to polymerization catalyst systems and processes for the preparation of polypropylene, and more particularly relates, in one embodiment, to polymerization catalyst systems for and controlled polymerization processes for the preparation of polypropylene of specified molecular weight distribution and tacticity that give improvement in physical properties and processability of polypropylene film.

BACKGROUND OF THE INVENTION

Thermoplastic olefin polymers, such as linear polyethylene, polypropylene, and olefin copolymers, are formed in polymerization reactions where a monomer is introduced into a reactor with an appropriate catalyst to produce the olefin homopolymer or copolymer. The polymer is withdrawn from the polymerization reactor and may be subjected to appropriate processing steps and then extruded as a thermoplastic mass through an extruder and die mechanism to produce the polymer as a raw material in particulate form, usually as pellets or granules. The polymer particles are ultimately heated and processed in the formation of the desired end products.

Polypropylene manufacturing processes may involve the polymerization of propylene monomer with an organometallic catalyst of the Ziegler-Natta type. The Ziegler-Natta type catalyst polymerizes the propylene monomer to produce predominantly solid crystalline polypropylene. Polypropylene is most often produced as a stereospecific polymer. Many desirable product properties, such as strength and durability, depend on the crystallinity of the polypropylene that in turn is dependent on the stereospecific arrangement of methyl groups on the polymer backbone.

Stereospecific polymers are polymers that have a defined arrangement of molecules in space. Both isotactic and syndiotactic propylene polymers, for example, are stereospecific. The isotactic structure is typically described as having the methyl groups attached to the tertiary carbon atoms of successive monomeric units on the same side of a hypothetical plane through the main chain of the polymer, e.g., the methyl groups are all above or all below the plane. Isotactic polypropylene can be illustrated by the following chemical formula:

This structure provides a highly crystalline polymer molecule. Using the Fisher projection formula, the stereochemical sequence of isotactic polypropylene may be shown as follows:

Another way of describing the structure is through the use of NMR spectroscopy, Bovey's NMR nomenclature for an isotactic pentad is mmmm with each "m" representing a "meso" dyad or successive methyl groups on the same side in the plane. As known in the art, any deviation or inversion in the structure of the chain lowers the degree of isotacticity and crystallinity of the polymer.

This crystallinity distinguishes isotactic polymers from an amorphous or atactic polymer, which is soluble in an aromatic solvent such as xylene. Atactic polymer exhibits no regular order of repeating unit configurations in the polymer chain and forms essentially a waxy product. That is, the methyl groups in atactic polypropylene are randomly positioned. While it is possible for a catalyst to produce both amorphous and crystalline fractions, it is generally desirable for a catalyst to produce predominantly crystalline polymer with very little atactic polymer.

Catalyst systems for the polymerization of olefins are well known in the art. Typically, these systems include a Ziegler-Natta type polymerization catalyst; a co-catalyst, usually an organoaluminum compound; and an external electron donor compound or selectivity control agent, usually an organosilicon compound. Examples of such catalyst systems are shown in the following U.S. Pat. Nos. 4,107,413; 4,294,721; 4,439,540; 4,115,319; 4,220,554; 4,460,701; and 4,562,173; the disclosures of these patents are hereby incorporated by reference. These are just a few of the scores of issued patents relating to catalysts and catalyst systems designed primarily for the polymerization of propylene and ethylene.

Ziegler-Natta catalysts for the polymerization of isotactic polyolefins are well known in the art. The Ziegler-Natta catalysts are stereospecific complexes derived from a halide of a transition metal, such as titanium, chromium or vanadium with a metal hydride and/or metal alkyl, typically an organoaluminum compound as a co-catalyst. The catalyst is usually comprised of a titanium halide supported on a magnesium compound. Ziegler-Natta catalysts, such as titanium tetrachloride ($TiCl_4$) supported on an active magnesium dihalide, such as magnesium dichloride or magnesium dibromide, as disclosed, for example, in U.S. Pat. Nos. 4,298,718 and 4,544,717, both to Mayr, et al. are supported catalysts. Silica may also be used as a support. The supported catalyst may be employed in conjunction with a co-catalyst such as an alkylaluminum compound, for example, triethyl aluminum (TEAl), trimethyl aluminum (TMA) and triisobutyl aluminum (TIBAL).

In the utilization of a Ziegler-Natta catalyst for the polymerization of propylene, it is generally desirable to add an external donor. External donors act as stereoselective control agents to control the amount of atactic or non-stereoregular polymer produced during the reaction, thus reducing the amount of xylene solubles. Examples of external donors include the organosilicon compounds such as cyclohexylmethyldimethoxysilane (CMDS), dicyclopentyldimethoxysilane (CPDS) and diisopropyldimethoxysilane (DIDS).

It is generally possible to control catalyst productivity (i.e., lbs. of polypropylene/lb. catalyst or other weight ratios) and product isotacticity within limits by adjusting the molar feed ratio of co-catalyst to external electron donor (and their corresponding ratios to the active metal content, e.g., titanium, in the Ziegler-Natta catalyst). Increasing the amount of external electron donor decreases the xylene solubles but may reduce activity and hence catalyst productivity. The xylene solubles (XS) content of the polypropylene product is a measure of the degree of stereoselectivity. Further, the polymer stereoregularity may be obtained by directly measuring the microtacticity of the product via $^{13}C$ Nuclear Magnetic Resonance spectroscopy.

Selectivity to isotactic polypropylene is typically determined under the XS test by measuring the amount of polypropylene materials that are xylene soluble. The xylene-solubles were measured by dissolving polymer in hot xylene, cooling the solution to 0° C. and precipitating out the crystalline material. The xylene solubles are the wt. % of the polymer that was soluble in the cold xylene.

In particular with respect to film grade polyolefin resins for biaxially oriented polypropylene (BOPP) applications, there is continuing interest in identifying catalyst systems that offer potential improvements in polymer physical properties and processability. Some previous studies have focused on efforts to enhance resin processability/extrusion characteristics via broadening of polymer molecular weight distribution through utilization of particular donor types (e.g., bis(perhydroisoquinolino)dimethoxysilane (BPIQ)). Other, more recent studies have focused on the use of fluoroalkylsilane compounds (e.g., 3,3,3-trifluoro-propylmethyldimethoxysilane ("E" donor)) that potentially allow for a controlled lower polymer stereoregularity and slightly lower polymer melting temperature, thereby potentially improving resin processability during film production. Indeed, these various catalyst system approaches to the modification of polymer properties for potential enhancement of film grade characteristics have shown varying degrees of promise. Having a polymer for film applications with a broadened molecular weight distribution would be advantageous. Additionally, the use of n-butylmethyldimethoxysilane (BMDS) has been shown to reduce polymer microtacticity.

It would be particularly advantageous to determine the optimum types of external and internal donors to obtain a desirable polymer having a broadened molecular weight distribution while still maintaining a reduced microtacticity.

SUMMARY OF THE INVENTION

In one embodiment, the present invention includes a process for the polymerization or copolymerization of propylene monomer, comprising: (a) providing a succinate-containing Ziegler-Natta catalyst; (b) contacting the catalyst with an organoaluminum compound; (c) contacting the catalyst with at least one external electron donor comprising n-butylmethyldimethoxysilane (BMDS) simultaneously with or subsequent to (b); (d) introducing the catalyst into a polymerization reaction zone containing the organoaluminum compound, the electron donor and propylene monomer; and (e) removing polypropylene homopolymer or copolymer from the polymerization reaction zone.

In one embodiment, the present invention includes a catalyst system for the polymerization or copolymerization of olefins comprising: (a) a succinate-containing Ziegler-Natta catalyst; (b) an organoaluminum compound; and (c) at least one external electron donor comprising n-butylmethyldimethoxysilane (BMDS).

In one embodiment, the present invention includes a polypropylene comprising a propylene polymer or copolymer wherein the polypropylene has a melt flow of at least about 0.5 g/10 min. and xylene solubles of not more than about 6 wt. %, a meso pentad level of between about 91 and about 99 mol %, and a T* value of from about 160° C. to about 170° C.

In one embodiment, the present invention includes an article of manufacture comprising a polypropylene film having a melt flow of at least about 0.5 g/10 min. and xylene solubles of not more than about 6 wt. %, a meso pentad level of between about 91 and about 99 mol %, and a T* value of from about 160° C. to about 170° C.

DETAILED DESCRIPTION OF THE INVENTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Various terms as used herein are shown below. To the extent a term used in a claim is not defined below, it should be given the broadest definition persons in the pertinent art have given that term as reflected in printed publications and issued patents. Further, unless otherwise specified, all compounds described herein may be substituted or unsubstituted and the listing of compounds includes derivatives thereof.

Certain polymerization processes disclosed herein involve contacting olefin monomers with one or more catalyst systems to form a polymer.

Catalyst Systems

It has been surprisingly discovered that the use of a succinate-containing Ziegler-Natta catalyst that includes n-butylmethyldimethoxysilane (BMDS) as an external electron donor for the polymerization of propylene can yield a polymer with a controlled microtacticity and broadened molecular weight distribution. More specifically, new polypropylene resins with tailored and controlled chain defects/defect distribution and a broader molecular weight distribution can result in improved stretchability of polypropylene films and easier flow and better gauge uniformity in extrusion.

The Ziegler-Natta catalysts useful in the present invention include those derived from a halide of a transition metal, such as titanium, chromium or vanadium, with titanium being the preferred metal in many embodiments. Examples of transition metal compounds include, but are not necessarily limited to, $TiCl_4$, $TiBr_4$, $TiO(C_2H_5)_3Cl$, $Ti(OC_2H_5)_3Cl$, Ti(OC$_3$H$_7$)$_2$Cl$_2$, TiO(C$_6$H$_{13}$)$_2$Cl$_2$, Ti(OC$_2$H$_5$)$_2$Br$_2$ and Ti(OC$_{12}$H$_{25}$)Cl$_3$. The transition metal compounds may be used individually or in combination. Typical titanium levels are from about 1.0% to about 5.0% by weight of catalyst, in one non-limiting embodiment of the invention. The Ziegler-Natta catalyst may be a transition metal compound of the formula MR$^+_x$ where M is selected from the group consisting of titanium, chromium, and vanadium, R is selected from the group consisting of halogen or a hydrocarboxyl, and x is the valence of M.

The transition metal halide is used in combination with a metal hydride and/or metal alkyl, typically an organoaluminum compound as a co-catalyst. Desirably the co-catalyst is an aluminum alkyl having the formula AlR$_3$, where R is an alkyl group having 1 to 8 carbon atoms, with R being the same or different. Examples of suitable aluminum alkyls include, but are not necessarily limited to, trimethyl aluminum (TMA), triethyl aluminum (TEAl) and triisobutyl aluminum (TIBAL). In one non-limiting embodiment of the invention, the desired aluminum alkyl is TEAl.

In the present invention, the Ziegler-Natta catalyst must contain at least one internal donor. Examples of suitable internal donors include, but are not necessarily limited to, diethers (such as those discussed in U.S. Pat. Nos. 4,971,937 and 5,106,807, which are incorporated herein by reference), aromatic diesters such as alkyl phthalate donors (e.g. diethyl phthalate, di-isobutyl phthalate, such as those listed in U.S. Pat. No. 5,945,366, which is also incorporated herein by reference), amines, amides, ketones, nitrites, phosphines, thioethers, thioesters, aldehydes, alcoholates, salts of organic acids, and combinations thereof. Preferred internal donors include, but are not necessarily limited to, esters of phthalic acid such as di-isobutyl, dioctyl, diphenyl, and benzylbutyl, and the like, succinic acid esters and combinations thereof. However, in the present invention, at least one internal donor must be a succinic acid ester. It has been found that the use of a succinate-containing Ziegler-Natta catalyst produces resins having broader molecular weight distributions. These internal electron donors are added during the preparation of the catalysts and may be combined with the support or otherwise complexed with the transition metal halide.

The Ziegler-Natta catalyst is typically a supported catalyst. Suitable support materials include magnesium compounds, such as magnesium halides, dialkoxymagnesiums, alkoxymagnesium halides, magnesium oxyhalides, dialkylmagnesiums, magnesium oxide, magnesium hydroxide, and carboxylates of magnesium. Typical magnesium levels are from about 12% to about 20% by weight of catalyst.

In the subject invention, the Ziegler-Natta catalyst must be used with at least one external donor compound, such as a Lewis base. More specifically, external donors are typically organosilicon compounds. External electron donors may be those described by the formula SiR$_m$(OR')$_{4-m}$, where R is an alkyl group, a cycloalkyl group, an aryl group or a vinyl group, R' is an alkyl group, m is 0-4, each R' may be the same or different, and each R may be the same or different. In particular, the external electron donor acts as a stereoregulator to control the amount of atactic form of polymer produced, which results is in a decrease in xylene solubles. Examples of electron donors that are organic silicon compounds are disclosed in U.S. Pat. Nos. 4,218,339; 4,395,360; 4,328,122; 4,473,660 and 4,927,797, which are incorporated herein by reference. Representative examples of external donors include cyclohexylmethyldimethoxysilane (CMS), dicyclopentyldimethoxysilane (CPDS), diisopropyldimethoxysilane (DIDS), cyclohexylisopropyldimethoxysilane (CIDS), di-t-butyldimethoxysilane (DTDS), (3,3,3-trifluoropropyl)methyldimethoxysilane ("E" donor), and combinations thereof. However, in the subject invention, at least one of the electron donors that should be used is n-butylmethyldimethoxysilane (BMDS). As discussed, BMDS has been discovered to be used with Ziegler-Natta catalysts to produce polypropylene with a lower degree of microtacticity that is advantageous for BOPP film processability, but while retaining desirable melt flow and xylene solubles levels. It is within the scope of this invention to use BMDS in conjunction with one or more other external donors including, but not necessarily limited to, CMDS, CPDS, DIDS, CIDS, DTDS and/or "E" donor. In some cases it will be found that there is a synergistic effect between the internal donor and the external donor. That is, results will be obtained with a particular combination of internal donor and external donor that cannot be achieved with one or the other individually.

Unless specified otherwise, amounts of external donor are presented herein as parts per million (ppm) based on the weight of monomer. In one non-limiting embodiment of the invention, the amount of BMDS ranges from about 0.5 to about 500 ppm, preferably from about 2 to about 200 ppm, and most preferably from about 4 to about 20 ppm. Desirably, any second or subsequent external donor is used in the range of from about zero to about 5 ppm, with from about zero to about 3 ppm being preferred, from about zero to about 2 ppm being more preferred, from about zero to about 1.5 ppm being even more preferred, from about zero to about 1 ppm being still more preferred, and from about zero to about 0.5 ppm being still more preferred. The Al/Si molar ratio (organoaluminum compound to silane donor) may range from about 0.5 to about 500, preferably from about 1 to about 200, and most preferably from about 1 to about 100.

Polymerization Processes

As indicated elsewhere herein, catalyst systems are used to make polyolefin compositions. Once the catalyst system is prepared, as described above and/or as known to one skilled in the art, a variety of processes can be carried out using that composition. Among the varying approaches that can be used include procedures set forth in U.S. Pat. No. 5,525,678, incorporated by reference herein. The equipment, process conditions, reactants, additives and other materials will of course vary in a given process, depending on the desired composition and properties of the polymer being formed. For example, the processes of U.S. Pat. Nos. 6,420,580, 6,380,328, 6,359,072, 6,346,586, 6,340,730, 6,339,134, 6,300,436, 6,274,684, 6,271,323, 6,248,845, 6,245,868, 6,245,705, 6,242,545, 6,211,105, 6,207,606, 6,180,735 and 6,147,173 may be used and are incorporated by reference herein.

The catalyst systems described above can be used in a variety of polymerization processes, over a wide range of temperatures and pressures. The temperatures may be in the range of from about 30° C. to about 120° C., or from about 50° C. to about 100° C. and the pressures employed may be in the range of from 5 atmospheres to about 50 atmospheres or higher.

Polymerization processes may include solution, gas phase, slurry phase, high pressure processes or a combination thereof.

In certain embodiments, the process of the invention is directed toward a solution, high pressure, slurry or gas phase polymerization process of one or more olefin monomers having from 2 to 30 carbon atoms, or from 2 to 12 carbon atoms or from 2 to 8 carbon atoms, such as ethylene, propylene, butene, pentene, methylpentene, hexene, octene and decene. Other monomers include ethylenically unsaturated monomers, diolefins having from 4 to 18 carbon atoms, conjugated or nonconjugated dienes, polyenes, vinyl monomers and cyclic olefins. Non-limiting monomers may include norbornene, nobornadiene, isobutylene, isoprene, vinylbenzocyclobutane, styrenes, alkyl substituted styrene, ethylidene norbornene, dicyclopentadiene, and cyclopentene. In one embodiment, a copolymer is produced, such as propylene/ethylene, or a terpolymer is produced. Examples of solution processes are described in U.S. Pat. Nos. 4,271,060, 5,001, 205, 5,236,998 and 5,589,555, which are incorporated by reference herein.

One example of a gas phase polymerization process generally employs a continuous cycle, wherein a cycling gas stream (otherwise known as a recycle stream or fluidizing medium) is heated in a reactor by heat of polymerization. The heat is removed from the recycle stream in another part of the cycle by a cooling system external to the reactor. The gaseous stream containing one or more monomers may be continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. Nos. 4,543,399, 4,588,790, 5,028,670, 5,317,036, 5,352,749, 5,405,922, 5,436,304, 5,456,471, 5,462,999, 5,616,661 and 5,668,228, which are incorporated by reference herein.)

The reactor pressure in a gas phase process may vary from about 100 psig to about 500 psig, or from about 200 psig to about 400 psig or from about 250 psig to about 350 psig, for example. The reactor temperature in a gas phase process may vary from about 30° C. to about 120° C., or from about 60° C. to about 115° C., or from about 70° C. to about 110° C. or from about 70° C. to about 95° C. Hydrogen, optionally, may be added as a molecular weight control. Other gas phase processes contemplated by the process includes those described in U.S. Pat. Nos. 5,627,242, 5,665,818 and 5,677,375, which are incorporated by reference herein.

Slurry processes generally include forming a suspension of solid, particulate polymer in a liquid polymerization medium, to which monomers and optionally hydrogen, along with catalyst, are added. The suspension (which may include diluents) can be intermittently or continuously removed from the reactor where the volatile components can be separated from the polymer and recycled, optionally after a distillation, to the reactor. The liquefied diluent employed in the polymerization medium is typically an alkane having from 3 to 7 carbon atoms, such as a branched alkane. The medium employed is generally liquid under the conditions of polymerization and relatively inert, such as hexane or isobutane. Hydrogen, optionally, may be added as a molecular weight control.

A slurry process or a bulk process (e.g., a process without a diluent) may be carried out continuously in one or more loop reactors. The catalyst, as a slurry or as a dry free flowing powder, can be injected regularly to the reactor loop, which can itself be filled with circulating slurry of growing polymer particles in a diluent. Hydrogen, optionally, may be added as a molecular weight control. The reactor may be maintained at a pressure of from about 27 bar to about 45 bar and a temperature of from about 38° C. to about 121° C., for example. Reaction heat can be removed through the loop wall since much of the reactor is in the form of a double-jacketed pipe. The slurry may exit the reactor at regular intervals or continuously to a heated low pressure flash vessel, rotary dryer and a nitrogen purge column in sequence for removal of the diluent and all unreacted monomer and comonomers. The resulting hydrocarbon free powder can then be compounded for use in various applications. Alternatively, other types of slurry polymerization processes can be used, such as stirred reactors in series, parallel or combinations thereof.

Polymer Product

The polymers produced by the processes described herein can be used in a wide variety of products and end-use applications. The polymers may include polypropylene and polypropylene copolymers.

In certain embodiments, propylene based polymers can be produced using the processes described herein. These polymers include atactic polypropylene, isotactic polypropylene, hemi-isotactic and syndiotactic polypropylene. Other propylene polymers include propylene block or impact copolymers.

Such propylene polymers may have a molecular weight distribution, i.e., a weight average molecular weight to number average molecular weight (Mw/Mn), of from about 4 to about 20, or from about 6 to about 15, or from about 8 to about 10 for example.

In addition, the propylene polymers may have a melt flow rate (MFR) of from about 1.0 dg/min to about 8.0 dg/min or from about 2.0 dg/min to about 6.0 dg/min or from about 3.0 dg/min to about 4.0 dg/min, for example.

In addition, the propylene polymers may have a xylene solubles of from less than 6 wt. %, or from about 1 wt. % to about 5 wt. %, or from 2 wt. % to about 4.5 wt. %, or from about 3 wt. % to about 4 wt. %, for example.

The propylene polymers may further have a T* value of at least about 150° C., or from about 160° C. to about 170° C., or from about 163° C. to about 168° C. or from about 164° C. to about 167° C. for example.

The propylene polymer may have % meso pentad values, as measured by $^{13}$C NMR on the crystalline fraction, of from about 91 mol % to about 99 mol %, or from about 92 mol % to about 97 mol %, or from about 93 mol % to about 96 mol %.

Product Application

The polymers produced are useful in a variety of end-use applications, such as film production. The film may be produced in the conventional manners known to those of ordinary skill in the art.

In order to modify or enhance certain properties of the films for specific end-uses, it is possible for the film to contain appropriate additives in effective amounts. The additives may be employed either in the application phase (formation of film) or may be combined with the polymer during the processing phase (pellet extrusion), for example. Such additives may include stabilizers (e.g., hindered amines, benzofuranon, indolinone) to protect against UV degradation, thermal or oxidative degradation and/or actinic degradation, antistatic agents (e.g., medium to high molecular weight polyhydric alcohols and tertiary amines), anti-blocks, coefficient of friction modifiers, processing aids, colorants, clarifiers, nucleators, and other additives known to those skilled in the art.

The polymer based films may be used in heat seal applications, BOPP (biaxially oriented polypropylene), heat shrink applications, breathable film applications, heat resistant film applications, tape applications, applications requiring high clarity and/or high gloss film, and other such applications using polypropylene based films.

EXAMPLES

Polymerization experiments were conducted at 70° C. to prepare resins with melt-flow and xylene soluble levels near those required by film-grade consumers, Table 1. Homopolymers were produced with CMDS, BMDS, BPIQ, and CPDS. The polymer MWD was determined by gel permeation chromatography (GPC). ZN672S (available from Basell, and containing a succinate internal donor and a phthalate internal donor) gives broad MWD that can be further increased by judicious external donor selection.

Incorporating $^{13}$C NMR work comparing THC A-021 (available from Toho Catalyst Ltd. and containing a phthalate internal donor) and ZN672S, it was found that the meso pentad fraction is lower for THC A-021 for each specific donor, Table 2. However, the results clearly show that BMDS yields desirably lower microtacticities than do the other silane donors, and the succinate-containing catalyst, ZN672S, yields desirable broader polymer molecular weight distributions than does the phthalate-containing catalyst, THC A-021.

TABLE 1

Reaction conditions and results in utilizing ZN672S.

| Run# | External Donor | Al/Si (mol/mol) | H2 (mol %) | Yield (g) | BD (g/mL) | MF (dg/min) | XS (wt %) | Mn (g/mol) | Mw (g/mol) | Mz (g/mol) | MWD (Mw/Mn) |
|---|---|---|---|---|---|---|---|---|---|---|---|
| 1 | BMDS | 20 | 0.08 | 254 |  | 3.1 | 3.4 | 48,000 | 423,000 | 1,080,000 | 8.8 |
| 2 | BPIQ | 133 | 0.15 | 250 | 0.49 | 2.5 | 3.0 | 35,000 | 545,000 | 3,386,000 | 15.5 |
| 4 | CMDS | 100 | 0.10 | 262 | 0.46 | 3.1 | 3.0 | 45,500 | 499,000 | 2,903,000 | 11.0 |
| 5 | CPDS | 250 | 0.13 | 300 | 0.46 | 2.5 | 3.4 | 44,000 | 467,000 | 1,973,000 | 10.6 |

TABLE 2

XIHI fraction $^{13}$C-NMR data concerning use of BMDS and CMDS

| Catalyst | External Donor | mmmm | mmmr | rmmr | mmrr | xmrx | mmrr | rrrr | rrrm | mrrm | % meso | % racemic | % error | def/ 1000 C | MWD (Mw/Mn) |
|---|---|---|---|---|---|---|---|---|---|---|---|---|---|---|---|
| ZN672S | BMDS | 94.7 | 1.8 | 0.2 | 1.7 | 0.3 | 0.0 | 0.2 | 0.1 | 0.9 | 97.8 | 2.2 | 0.3 | 11.2 | 8.8 |
| ZN672S | CMDS | 96.4 | 1.7 | 0.4 | 0.9 | 0.2 | 0.0 | 0.0 | 0.0 | 0.4 | 99.0 | 1.0 | 0.5 | 5.0 | 11.0 |
| A-021 | BMDS | 93.0 | 3.1 | 0.3 | 2.2 | 0.4 | 0.0 | 0.0 | 0.0 | 1.0 | 97.7 | 2.3 | 0.5 | 11.4 | 6.0 |
| A-021 | CMDS | 94.1 | 2.8 | 0.6 | 1.6 | 0.3 | 0.0 | 0.0 | 0.0 | 0.7 | 98.4 | 1.6 | 0.8 | 8.0 | 8.3 |

Pentad values are in mol %.

Figure 1:
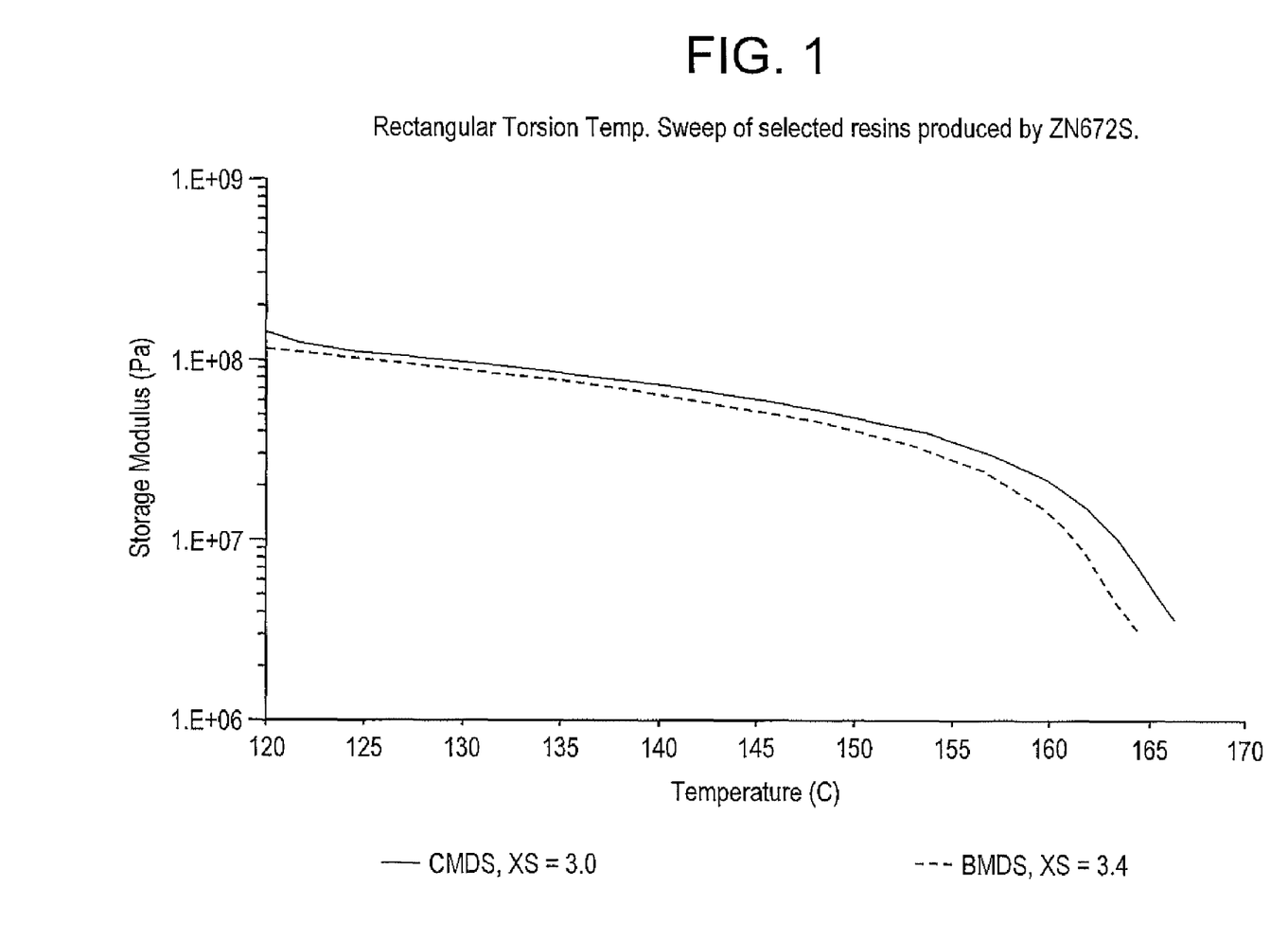
FIG. 1 is a graph showing the Rectangular Torsion Temperature Sweep of resins produced by ZN672S.

The resin stiffness is related in FIG. 1 by the storage modulus data.

THC A-021 and ZN 672 VS (available from Basell, smaller particle size version of Basell's succinate-containing catalyst, $D_{50}$~13μ) were used in the presence of various external donors to obtain resins with modified molecular weight distributions and/or microtacticities. In the polymerization experiments, THC A-021 and ZN 672 VS catalysts were used in the presence of CMDS (C-donor) and BMDS (n-butylmethyl dimethoxysilane). The runs were carried out using 10 mg catalyst, 1 mmol TEAl, temperature of 77° C., 1 hr reaction time, and in-situ prepolymerization. The hydrogen and donor concentrations were varied in an attempt to obtain specific polymer targets of MF~2-3 g/10 min, XS~3.5-4.5 wt %. Table 3 gives a summary of the polymerization results in the preparation of film grade resins.

TABLE 3

Laboratory Polymerization Results Using THC A-021 and ZN 672 VS in the Presence of Various External Donor Systems

| Run # | Catalyst | Donor | [D], mmol | Al/Si (mol/mol) | H$_2$, mol % | Activity g/g/h | Melt Flow (dg/min) | Xyl. Sols., wt % | Bulk Density g/cc |
|---|---|---|---|---|---|---|---|---|---|
| 9 | A-021 | CMDS | 0.0134 | 75 | 0.06 | 42000 | 2.8 | 4.3 | 0.41 |
| 12 | A-021 | BMDS | 0.067 | 15 | 0.03 | 21000 | 2.1 | 3.1 | 0.40 |
| 14 | ZN672VS | CMDS | 0.025 | 40 | 0.07 | 35200 | 2.3 | 3.9 | 0.44 |
| 16 | ZN672VS | BMDS | 0.1 | 10 | 0.04 | 20200 | 2.2 | 3.6 | 0.43 |

The various catalyst/donor systems were selected in order to obtain a range of polymer molecular weight distributions and microtacticities. Within the series of donors used, CMDS was utilized as the control case and BMDS was used to obtain a reduced microtacticity (i.e., higher chain defects). Further, the two catalyst types, phthalate and succinate-containing, were used due to their polymer MWD effects.

The molecular weights of the various resins were determined via GPC, and the results are given in Table 4.

TABLE 4

Molecular Weight Results for Laboratory-Prepared Film Resins

| Run # | Catalyst | Donor | Melt Flow (dg/min) | Xyl. Sols., wt % | Mn (/1000) (g/mol) | Mw (/1000) (g/mol) | Mz (/1000) (g/mol) | D (Mw/Mn) |
|---|---|---|---|---|---|---|---|---|
| 9 | A-021 | CMDS | 2.8 | 4.3 | 55.4 | 441 | 2330 | 7.9 |
| 12 | A-021 | BMDS | 2.1 | 3.1 | 76.4 | 486 | 2400 | 6.4 |

TABLE 4-continued

Molecular Weight Results for Laboratory-Prepared Film Resins

| Run # | Catalyst | Donor | Melt Flow (dg/min) | Xyl. Sols., wt % | Mn (/1000) (g/mol) | Mw (/1000) (g/mol) | Mz (/1000) (g/mol) | D (Mw/Mn) |
|---|---|---|---|---|---|---|---|---|
| 14 | ZN672VS | CMDS | 2.3 | 3.9 | 48.6 | 530 | 3570 | 10.9 |
| 16 | ZN672VS | BMDS | 2.2 | 3.6 | 56.0 | 565 | 3860 | 10.1 |

From the above results, it is seen that the resins prepared with THC A-021 and ZN 672 VS catalysts in the presence of various donors possessed relatively similar melt flows and xylene solubles levels. In the presence of C-donor, THC A-021 gave a polymer with a polydispersity of 7.9, typical for a phthalate-based catalyst, while the use of BMDS resulted in a somewhat more narrow polymer molecular weight distribution (D-6.4).

From the above GPC results, the succinate-containing catalyst, ZN 672 VS, gave desirably broader polymer molecular weight distributions than did THC A-021. In the presence of C-donor, ZN 672 VS gave a resin with a polydispersity of 10.9, while the use of BMDS again resulted in a somewhat more narrow molecular weight distribution (D-10.1).

Figure 2:
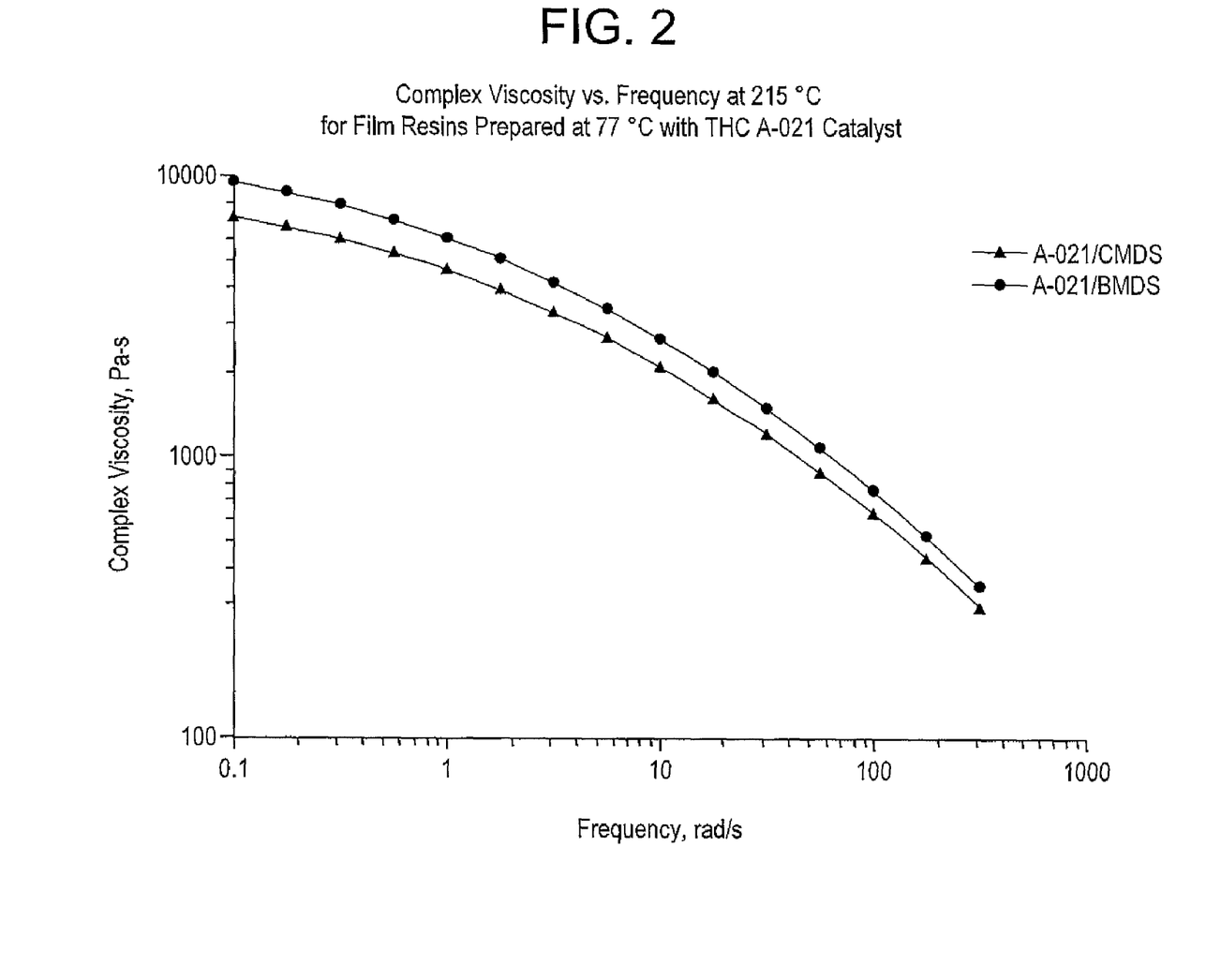
FIG. 2 is a graph showing the Complex Viscosity vs. Frequency at 215° C. for film resins prepared at 77° C. with THC A-021 catalyst.
Figure 3:
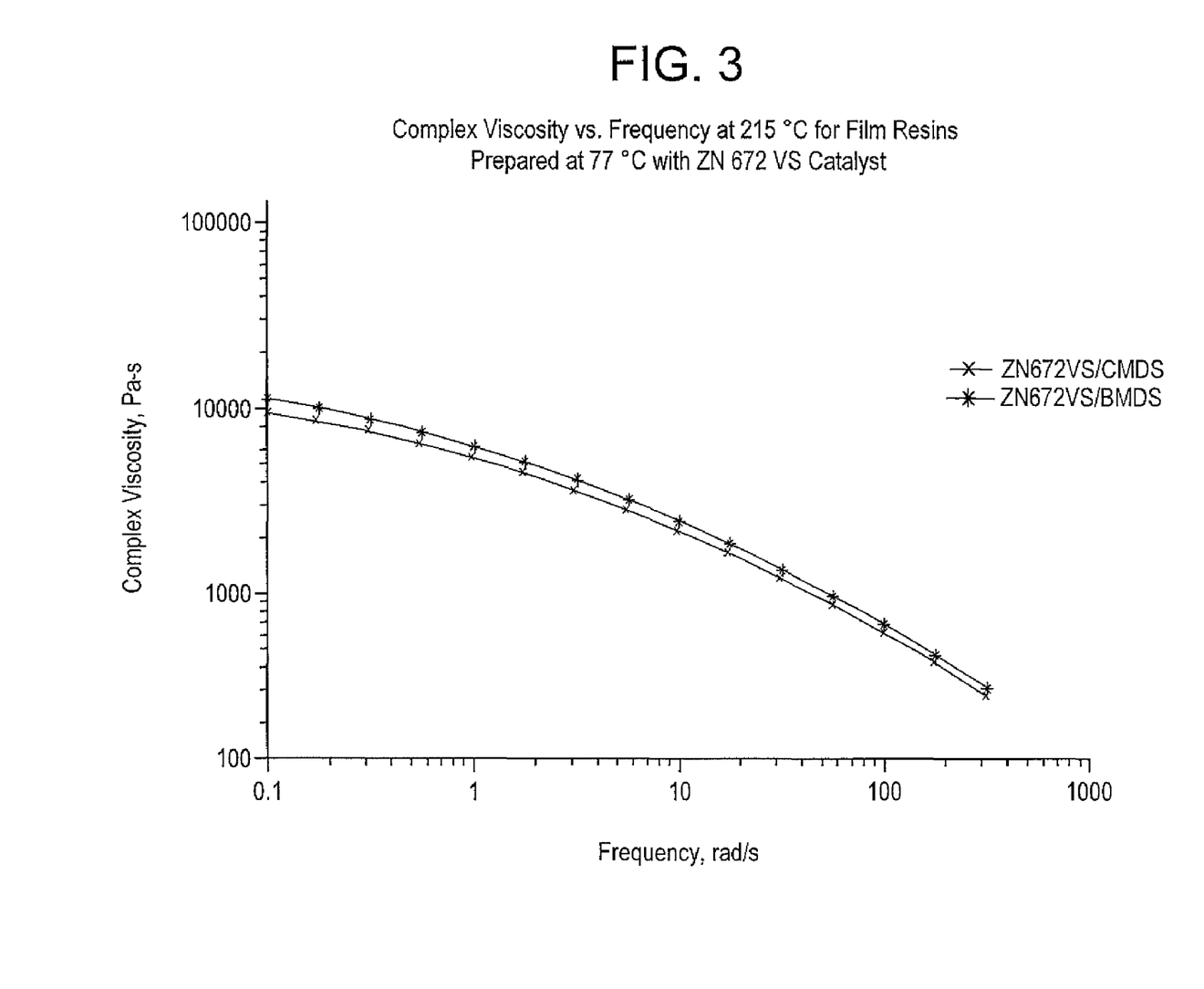
FIG. 3 is a graph showing the Complex Viscosity vs. Frequency at 215° C. for film resins prepared at 77° C. with ZN 672 VS catalyst.

Certainly, a critical aspect in the development of an optimum BOPP film resin is the rheological behavior of the polymer during processing. As such, the samples prepared in the laboratory with THC A-021 and ZN 672 VS catalysts in the presence of various donors were evaluated via Dynamic Mechanical Analysis (obtained using an ARES3-LS test station). In the DMA work, complex viscosities were obtained at three different temperatures (185, 215, and 245° C.) as a function of frequency. FIG. 2 shows the viscosity profiles at a representative temperature of 215° C. for the resins prepared with THC A-021, while FIG. 3 shows the viscosities of resins prepared with ZN 672 VS.

From the above results, it is seen that the viscosities of the resins decreased with increasing frequency, i.e., shear. With the use of the succinate-containing catalyst, ZN 672 VS, it was seen that all of the polymers possessed rather broad molecular weight distributions.

Figure 4:
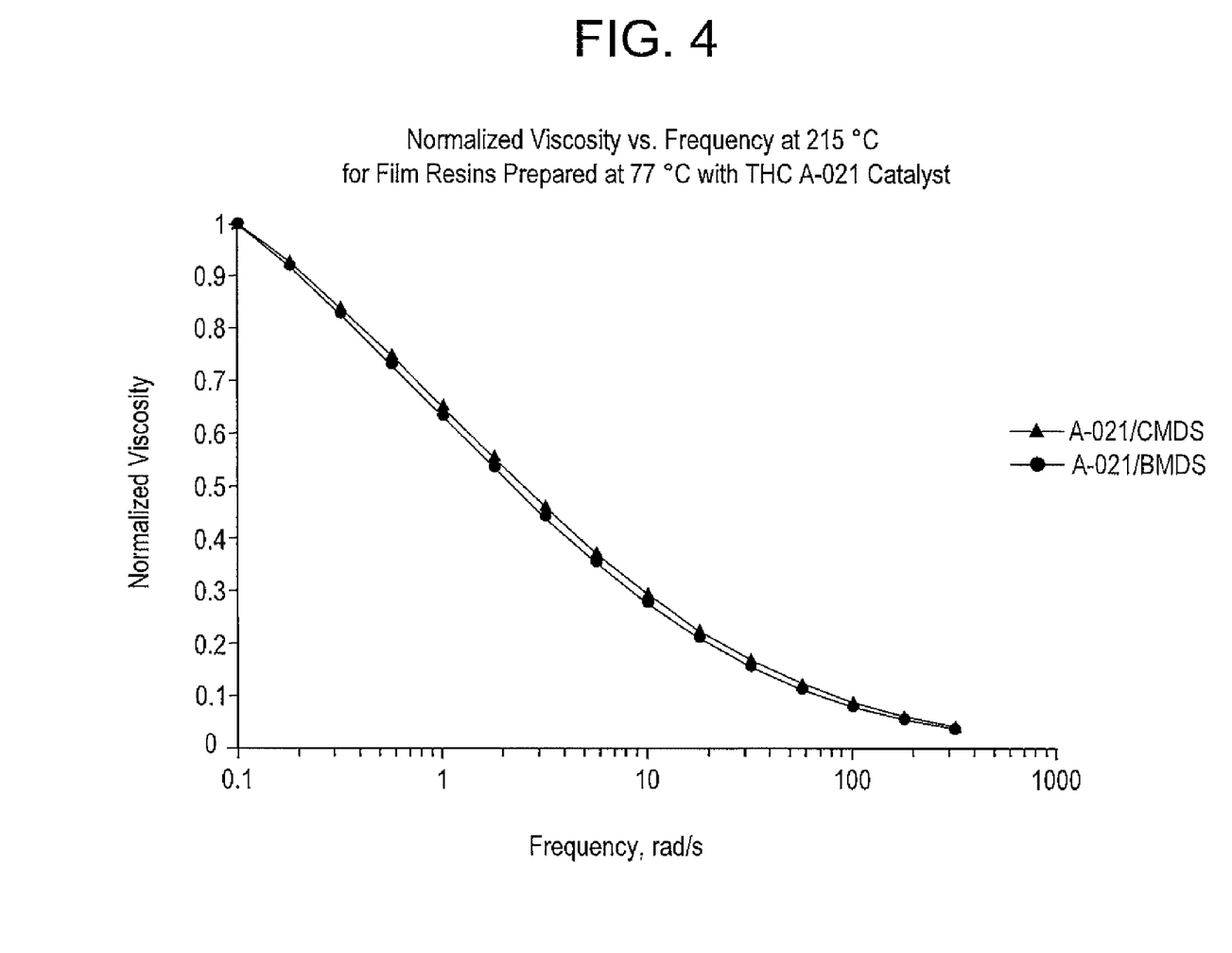
FIG. 4 is a graph showing the Normalized Viscosity vs. Frequency at 215° C. for film resins prepared at 77° C. with THC A-021 catalyst.

It is of further benefit to compare the normalized viscosities of the resins prepared with the various catalyst systems. A plot of the normalized viscosities ($\eta/\eta$ at frequency of 0.1 rad/s) at 215° C. for the polymers prepared with THC A-021 is shown in FIG. 4, while FIG. 5 shows the normalized viscosities of resins prepared with ZN 672 VS.

From the above results, it is seen that the samples prepared with A-021 in the presence of CMDS and BMDS (9 and 12, respectively) exhibited similar normalized viscosities at given shear rates, indicating that the differences in polydispersities (D-6.4 for BMDS, D-7.9 for CMDS) are not significantly affecting the rheological behavior.

Figure 5:
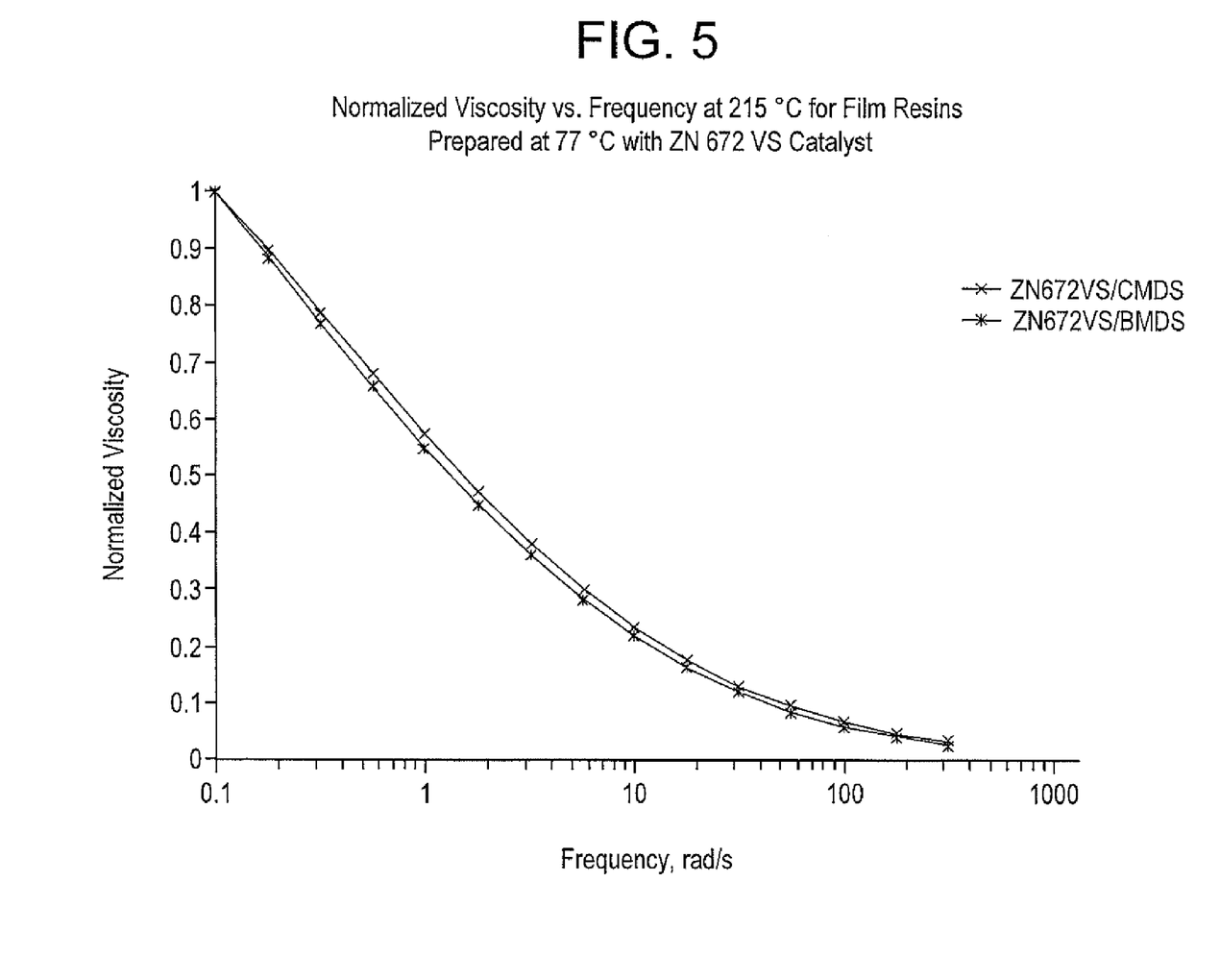
FIG. 5 is a graph showing the Normalized Viscosity vs. Frequency at 215° C. for film resins prepared at 77° C. with ZN 672 VS catalyst.

For the film grade polymers prepared with ZN 672 VS in the presence of various donors, there is somewhat less differentiation in the normalized viscosity profiles [FIG. 5] since all of the resins possess relatively broad MWDs. The results showed that the samples prepared with BMDS exhibited slightly lower normalized viscosities at given frequencies than did the polymers prepared with CMDS. Overall, however, it is clear that the use of the succinate-containing catalyst will yield resins with desirably broadened molecular weight distributions regardless of external donor type. The main interest, therefore, will be a microtacticity comparison.

Figure 6:
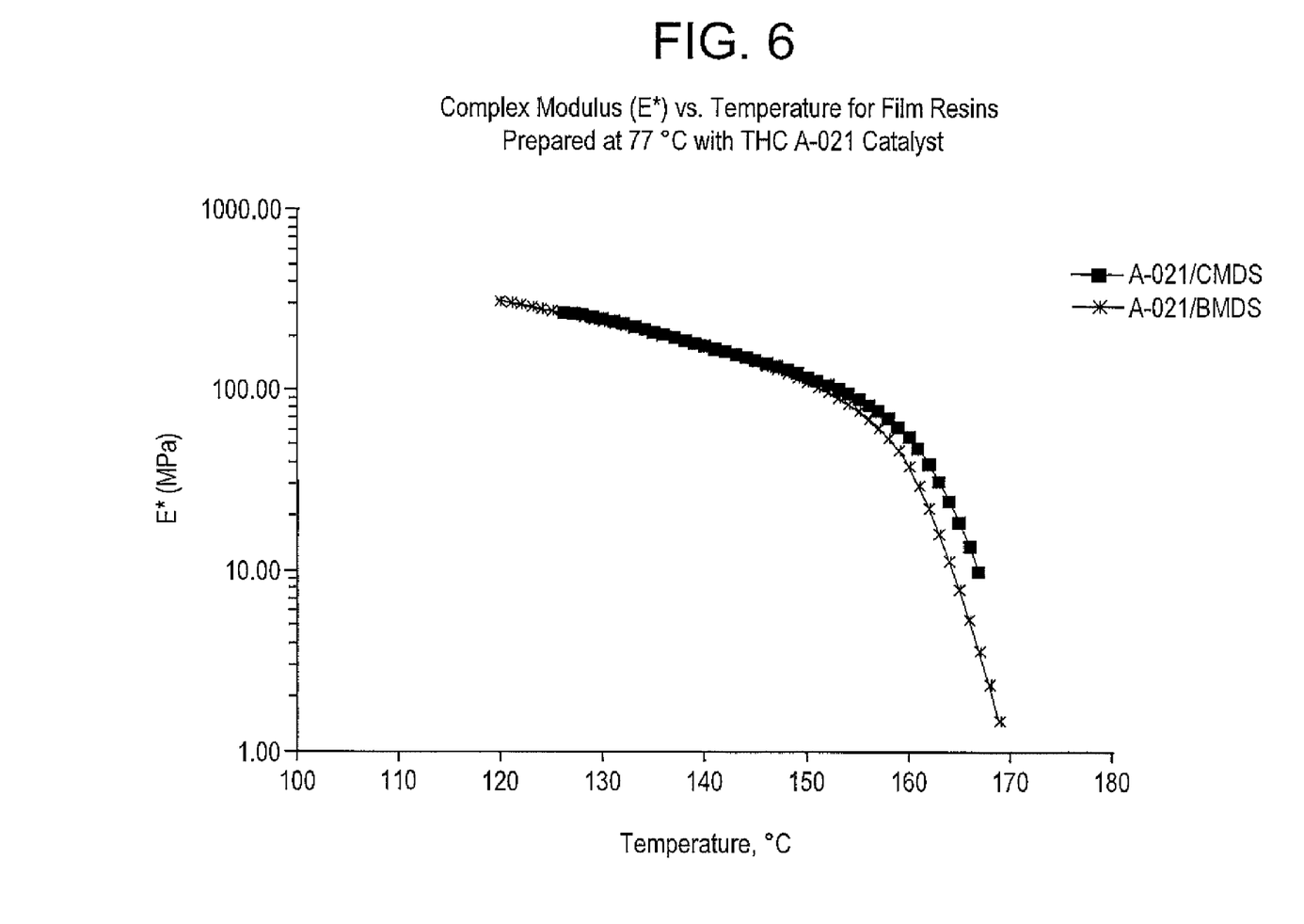
FIG. 6 is a graph showing the Complex Modulus (E*) vs. Temperature for film resins prepared at 77° C. with THC A-021 catalyst.

The film resins prepared in the laboratory with THC A-021 and ZN 672 VS using various donors were further characterized by DMA to determine their stiffness profiles as a function of temperature. Since the XS levels in the resins were relatively similar, the thermal behavior exhibited by the polymers should be rather attributable to the microtacticities of the crystalline portions. Further, a discrete temperature value, T* (i.e., the temperature at which E*=1.4×10$^7$ Pa), can be compared amongst the various samples. FIG. 6 shows the complex modulus vs. temperature results for resins prepared with THC A-021 in the presence of various donors, while FIG. 7 shows the stiffness profiles for the samples prepared with the succinate-containing catalyst, ZN 672 VS.

For the film grade resins prepared with THC A-021 [FIG. 6], it is seen that the complex modulus expectedly decreased with increasing temperature. The sample (12) prepared using BMDS exhibited the lowest stiffness profile and sharpest stiffness decrease as a function of temperature, even though the resin possessed a relatively low XS level of 3.1 wt %. These results indicate that the polymer microtacticity is relatively low (i.e., higher chain defects).

Figure 7:
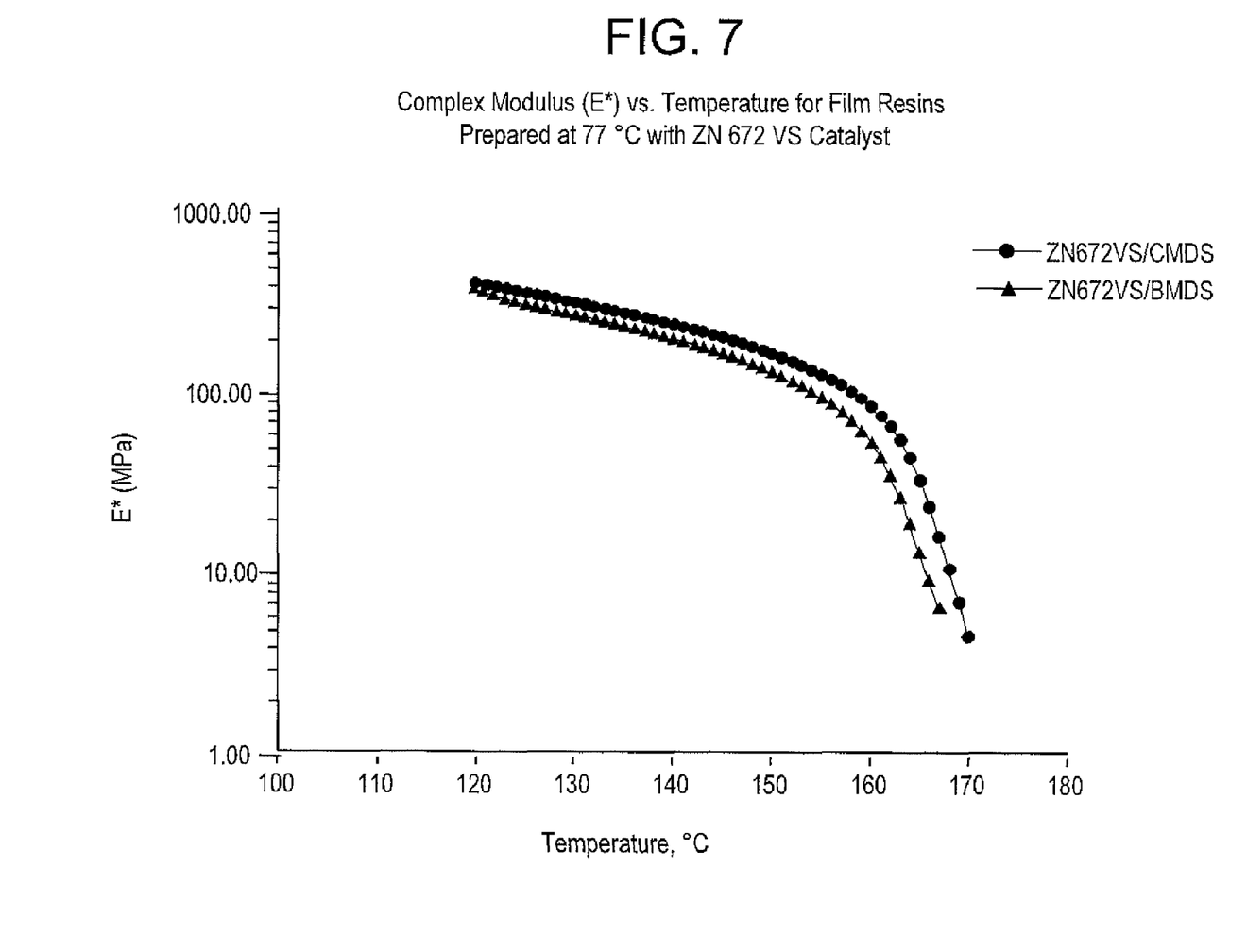
FIG. 7 is a graph showing the Complex Modulus (E*) vs. Temperature for film resins prepared at 77° C. with ZN 672 VS catalyst.

For the film grade resins prepared with the succinate-containing catalyst, ZN 672 VS [FIG. 7], it is seen that BMDS yielded the lowest stiffness profile over the entire temperature range. Again, these DMA results indicate that the polymer possesses a desirably decreased microtacticity which, coupled with the broad molecular weight distribution (D-10.1), could lead to enhanced processability and/or properties. Overall, the DMA studies showed that BMDS is effective with both A-021 and ZN 672 VS catalysts in reducing the stiffness of the resins.

From the dynamic mechanical results, the T* values (i.e., the temperature at which E*=1.4×10$^7$ Pa) for the resins were determined. Table 5 gives the T* values for the laboratory-prepared film resins.

TABLE 5

T* Values for Resins Prepared at 77° C. with THC A-021 and ZN 672 VS Catalysts in the Presence of Various Donors

| Sample # | Catalyst | Donor | Xylene Sols., wt % | T*, ° C. |
|---|---|---|---|---|
| 9 | A-021 | CMDS | 4.3 | 166.0 |
| 12 | A-021 | BMDS | 3.1 | 163.4 |
| 14 | ZN 672 VS | CMDS | 3.9 | 167.4 |
| 16 | ZN 672 VS | BMDS | 3.6 | 164.9 |

For the resins prepared with THC A-021, it is seen that CMDS gave a T* value of 166° C. The use of BMDS as the external donor resulted in a polymer with a significantly lower T* value of 163.4° C., thereby showing that this resin "softens" at a lower temperature and, thus, could be processed (e.g., biaxially stretched) at such desirably lower temperatures. The T* value of the sample prepared with ZN 672 VS/C exhibited a T* value of 167.4° C., about 1.4° C. higher than that of the resin from A-021/C, indicating a slightly higher stiffness for the succinate-produced polymer. In the case of ZN 672 VS/BMDS, the T* value was lower at 164.9° C., again showing a reduced stiffness due to desirably reduced polymer microtacticity.

Finally, it was of interest to examine the microstructures of the polymers prepared with THC A-021 and ZN 672 VS via $^{13}$C NMR.

Table 6 shows the microtacticities of the crystalline fractions (XIHI) for the various samples.

TABLE 6

Microtacticities of the Crystalline Fractions (XIHI) of Polymers Prepared at 77° C. with THC A-021 and ZN 672 VS Catalysts in the Presence of Various Donors

|  | 9 | 12 | 14 | 16 |
|---|---|---|---|---|
| Catalyst | A-021 | A-021 | ZN672VS | ZN672VS |
| Donor | CMDS | BMDS | CMDS | BMDS |
| XS, wt % | 4.3 | 3.1 | 3.9 | 3.6 |
| mmmm | 95.6 | 93.5 | 95.8 | 94.7 |
| mmmr | 1.5 | 2.3 | 1.4 | 1.8 |
| rmmr | 0.0 | 0.1 | 0.0 | 0.1 |
| mmrr | 1.5 | 2.3 | 1.4 | 1.8 |
| xmrx | 0.2 | 0.3 | 0.3 | 0.3 |
| mrmr | 0.0 | 0.0 | 0.0 | 0.0 |
| rrrr | 0.1 | 0.2 | 0.2 | 0.2 |
| rrrm | 0.3 | 0.3 | 0.3 | 0.3 |
| mrrm | 0.7 | 1.1 | 0.7 | 0.9 |
| % meso | 98.0 | 97.1 | 98.0 | 97.6 |
| % rac | 2.0 | 2.9 | 2.0 | 2.4 |
| % error | 0.2 | 0.2 | 0.2 | 0.2 |
| def/1000 | 10.0 | 14.7 | 9.9 | 11.8 |

Pentad values are in mol %.

From the above results, it is seen that the control resin prepared with THC A-021/C possessed a meso pentad level of 95.6 mol %, total meso level of 98.0 mol %, and 10 defects/1000° C. Finally, the use of BMDS gave a polymer with reduced microtacticity (mmmm-93.5 mol %) and increased defects, characteristics which may prove useful for BOPP applications.

In the case of ZN 672 VS, the use of CMDS gave a polymer with a meso pentad level of 95.8 mol %, slightly higher than that from A-021/C. Again, the use of BMDS gave the lowest microtacticity (mmmm-94.7 mol %), supporting the DMA results that showed lower stiffness for this resin. Thus, it may be concluded that the use of BMDS with either A-021 or ZN 672 VS will yield polymers with desirably reduced microtacticities.

Resins were extruded and Bruckner film stretching studies were performed. As such the following polymerization experiment was completed.

In the polymerization experiments, THC A-021 and ZN 672 VS catalysts were used in the presence of BMDS (n-butylmethyldimethoxysilane) as donor. The runs were carried out using 10 mg catalyst, 1 mmol TEAL, temperature of 77° C., 1 hr reaction time and in-situ prepolymerization. The hydrogen and donor concentrations were varied in an attempt to obtain polymer of MF: 2-3 g/10 min, XS: 3-4 wt %. Table 7 gives a summary of the multiple batch polymerization results for these targeted film grade resins.

TABLE 7

Characteristics of Laboratory Film Grade Batches Prepared with THC A-021 and ZN 672 VS in the Presence of BMDS

| Run # | Catalyst | Donor BMDS | Hydrogen Mol % | Yield, gms | Melt Flow, g/10 min |
|---|---|---|---|---|---|
| Batch 1 | THC-A-021 | Al/Si = 20 | 0.03 |  |  |
| Run 1 |  |  |  | 280 | 2.2 |
| Run 2 |  |  |  | 252 | 2.3 |
| Run 3 |  |  |  | 252 | 2.9 |
| Run 4 |  |  |  | 210 | 1.9 |
| Run 5 |  |  |  | 278 | 2.3 |
| Run 6 |  |  |  | 272 | 2.4 |
| Run 7 |  |  |  | 280 | 2.6 |
| Run 8 |  |  |  | 225 | 2.4 |
| Batch 2 | ZN 672 VS | Al/Si = 10 | 0.04 |  |  |
| Run 1 |  |  |  | 180 | 2.4 |

TABLE 7-continued

Characteristics of Laboratory Film Grade Batches Prepared with THC A-021 and ZN 672 VS in the Presence of BMDS

| Run # | Catalyst | Donor BMDS | Hydrogen Mol % | Yield, gms | Melt Flow, g/10 min |
|---|---|---|---|---|---|
| Run 2 |  |  |  | 196 | 2.1 |
| Run 3 |  |  |  | 182 | 1.5 |
| Run 4 |  |  |  | 186 | 2.3 |
| Run 5 |  |  |  | 186 | 2.4 |
| Run 6 |  |  |  | 140 | 2.4 |
| Run 7 |  |  |  | 186 | 2.9 |
| Run 8 |  |  |  | 202 | 2.5 |
| Run 9 |  |  |  | 202 | 3.0 |
| Run 10 |  |  |  | 160 | 3.1 |
| Run 11 |  |  |  | 190 | 2.6 |
| Run 12 |  |  |  | 184 | 2.5 |

From the above results, it is seen that the average activity of THC A-021/BMDS with ratio of Al/Si-20 and hydrogen of 0.03 mol % is 25,600 g/g/h. The melt flow of Batch 1 was 2.4 g/10 mins, while the XS level showed 3.39 wt % by analysis. The succinate-containing catalyst system, ZN 672 VS/BMDS, with Al/Si-10 and hydrogen of 0.04 mol % showed an average activity of 18,300 g/g/h, with a combined batch MF of 2.3 g/10 min. The XS level of Batch 2 was ~3.3 wt %. After combining and physically mixing, approximately 2.0 Kg of fluff of each Batch was sheet extruded and evaluated via the Bruckner film stretcher to gauge processability.

The molecular weights of the resins of the combined batches were determined via GPC, and the results are shown in Table 8.

TABLE 8

Molecular Weight Results for Film Grade Resins Prepared with THC A-021 and ZN 672 VS Catalysts in the Presence of BMDS

| Batch | Catalyst | M.F. (dg/min) | X.S. (wt %) | Mn/1000 (g/mol) | Mw/1000 (g/mol) | Mz/1000 (g/mol) | D (Mw/Mn) |
|---|---|---|---|---|---|---|---|
| 1 | THC A-021 | 2.4 | 3.1 | 65.3 | 474 | 2370 | 7.3 |
| 2 | ZN 672 VS | 2.3 | 3.3 | 61.1 | 494 | 2290 | 8.1 |

From the above results, it is seen that the resin prepared with THC A-021/BMDS exhibited a lower molecular weight distribution (D-7.3) than did the resin prepared with ZN 672 VS/BMDS (D-8.1) at similar MF and XS. Furthers it was of interest to assess the microtacticities of the polymers via $^{13}C$ NMR since it was anticipated that the use of BMDS would result in reduced stereoregularity. Table 9 gives the microtacticities of the resins prepared in the current study, as well as some comparative catalyst systems.

TABLE 9

Microtacticities of the Crystalline Fractions (XIHI) of Polymers Prepared at 77° C. with THC A-021 and ZN 672 VS Catalysts with BMDS Donor

|  | Batch 1 | Batch 2 | Run 9 | Run 14 |
|---|---|---|---|---|
| Catalyst | THC A-021 | ZN 672 VS | THC A-021 | ZN 672 VS |
| Donor | BMDS | BMDS | CMDS | CMDS |
| X.S % | 3.1 | 3.3 | 4.3 | 3.9 |
| mmmm | 94.1 | 94.4 | 95.6 | 95.8 |
| mmmr | 2.2 | 2.1 | 1.5 | 1.4 |
| rmmr | 0.1 | 0.1 | 0.0 | 0.0 |
| mmrr | 2.0 | 1.9 | 1.5 | 1.4 |
| xmrx | 0.2 | 0.2 | 0.2 | 0.3 |
| mrmr | 0.0 | 0.0 | 0.0 | 0.0 |
| rrrr | 0.1 | 0.2 | 0.1 | 0.2 |
| rrrm | 0.3 | 0.3 | 0.3 | 0.3 |

TABLE 9-continued

Microtacticities of the Crystalline Fractions (XIHI) of Polymers Prepared at 77° C. with THC A-021 and ZN 672 VS Catalysts with BMDS Donor

|  | Batch 1 | Batch 2 | Run 9 | Run 14 |
|---|---|---|---|---|
| mrrm | 1.0 | 0.9 | 0.7 | 0.7 |
| % meso | 97.5 | 97.6 | 98.0 | 98.0 |
| % rac | 2.5 | 2.4 | 2.0 | 2.0 |
| % error | 0.2 | 0.2 | 0.2 | 0.2 |
| Def/1000 | 12.7 | 12.0 | 10 | 9.9 |

Pentad values are in mol %.

From the above results, it is clear that both catalysts in the presence of BMDS gave lower microtacticities (mmmm-94.1 to 94.4 mol %) and increased defects (12-12.7) relative to CMDS.

Table 10 gives the rheological parameters for the various samples.

TABLE 10

Rheological Parameters at 190 C. for Resins Prepared at 77 C. with THC A-021 and ZN 672 VS catalysts in the presence of Donor BMDS

|  | Catalyst | Donor | Xylene Solubles wt % | Zero Shear n, Pa-s | Relaxation Time, sec | Breadth Parameter | T*, ° C. |
|---|---|---|---|---|---|---|---|
| Batch 1 | THC A-021 | BMDS | 3.13 | 8310 | 0.056 | 0.393 | 155.0 |
| Batch 2 | ZN 672 VS | BMDS | 3.29 | 18170 | 0.106 | 0.326 | 155.7 |
| Run 9 | THC A-021 | CMDS | 4.3 | 16780 | 0.086 | 0.368 | 166.0 |
| Run 14 | ZN 672 VS | CMDS | 3.9 | 26970 | 0.139 | 0.329 | 167.4 |

From the above results, it is seen that Batch 1 prepared with THC A-021/BMDS gave lower relaxation time and higher breadth parameter (i.e., rheologically narrower) due to the narrower molecular weight distribution, relative to the sample prepared with ZN 672 VS/BMDS. These results are in agreement with the molecular weight distributions obtained from GPC. Similar differences are noted between the two catalysts when used in the presence of CMDS. Also, it is evident that the resins prepared with BMDS are somewhat "softer" than those from CMDS based on the measured T* temperatures.

In the foregoing specification, the invention has been described with reference to specific embodiments thereof, and has been demonstrated as effective in providing a method for making a Ziegler-Natta catalyst system for the polymerization and copolymerization of propylene monomer. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations or amounts of co-catalysts, internal donors, and external donors, and other components falling within the claimed parameters, but not specifically identified or tried in a particular catalyst system, are anticipated and expected to be within the scope of this invention. Further, the method of the invention is expected to work at other conditions, particularly temperature, pressure and concentration conditions, than those exemplified herein.

We claim:

1. A process for the polymerization or copolymerization of propylene monomer, comprising:
   (a) providing a succinate-containing Ziegler-Natta catalyst;
   (b) contacting the catalyst with an organoaluminum compound;
   (c) contacting the catalyst with at least one external electron donor comprising n-butylmethyldimethoxysilane (BMDS) simultaneously with or subsequent to (b);
   (d) introducing the catalyst into a polymerization reaction zone containing the organoaluminum compound, the electron donor and propylene monomer; and
   (e) removing polypropylene homopolymer or copolymer from the polymerization reaction zone, wherein the polypropylene exhibits a molecular weight distribution of from 8 to 15.

2. The process of claim 1 wherein providing the succinate-containing Ziegler-Natta catalyst, the succinate containing Ziegler-Natta catalyst comprises a transition metal compound of the formula $MR^+_x$ where M is selected from the group consisting of titanium, chromium, and vanadium, R is selected from the group consisting of halogen or a hydrocarboxyl, and x is the valence of M.

3. The process of claim 1 wherein the polypropylene homopolymer or copolymer removed from the polymerization reaction zone has a meso pentad level of between about 91 and about 99 mol %.

4. The process of claim 1 wherein the polypropylene homopolymer or copolymer removed from the polymerization reaction zone has xylene solubles ranging from about 1 to about 6 weight %.

5. The process of claim 1 wherein the polypropylene homopolymer or copolymer removed from the polymerization reaction zone has a T* value of from about 150° C. to about 170° C.

6. The process of claim 1 wherein the organoaluminum compound is an aluminum trialkyl co-catalyst of the formula $AlR_3$, where R is an alkyl group having 1 to 8 carbon atoms, with R being the same or different.

7. The process of claim 6 wherein the organoaluminum co-catalyst is triethyl aluminum (TEAl).

8. The process of claim 1 wherein the Al/Si molar ratio (organoaluminum compound to silane donor) ranges from about 0.5 to about 500.

9. The process of claim 1 wherein the BMDS is present in an amount of from about 0.5 to about 500 ppm by weight of propylene monomer.

10. The process of claim 1 wherein the polymerization reaction zone additionally contains an olefin monomer other than propylene monomer.

11. The process of claim 10 wherein the olefin monomer is ethylene.

12. A process for the polymerization or copolymerization of propylene monomer, comprising:
   (a) providing a succinate-containing Ziegler-Natta catalyst;

(b) contacting the catalyst with an organoaluminum compound;
(c) contacting the catalyst with at least one external electron donor comprising n-butylmethyldimethoxysilane (BMDS) simultaneously with or subsequent to (b);
(d) introducing the catalyst into a polymerization reaction zone containing the organoaluminum compound, the electron donor and propylene monomer; and
(e) removing polypropylene homopolymer or copolymer from the polymerization reaction zone, wherein the polypropylene exhibits a molecular weight distribution that is higher than a polypropylene formed from a process utilizing a phthalate-containing Ziegler-Nana catalyst rather than the succinate-containing Ziegler-Nana catalyst.

* * * * *